United States Patent [19]
Ganser et al.

[11] Patent Number: 5,363,718
[45] Date of Patent: Nov. 15, 1994

[54] CONTROL DEVICE FOR A REMOTE-CONTROLLABLE ACTUATION DEVICE

[75] Inventors: Martin Ganser, Weil der Stadt; Alfred Klink, Horb, both of Germany

[73] Assignee: Mercedes-Benz AG, Germany

[21] Appl. No.: 965,926

[22] Filed: Oct. 23, 1992

[30] Foreign Application Priority Data

Oct. 25, 1991 [DE] Germany ............... 4135263

[51] Int. Cl.$^5$ ............................................. F16C 1/12
[52] U.S. Cl. ............................. 74/501.5 R; 74/569
[58] Field of Search .............. 74/97.1, 107, 471 R, 74/501.5 R, 569, 501.6, 567

[56] References Cited

U.S. PATENT DOCUMENTS

| | | | |
|---|---|---|---|
| 2,921,480 | 1/1960 | Wrighton et al. | 74/501.5 R |
| 3,116,923 | 1/1964 | Gunther | 74/569 X |
| 3,438,271 | 4/1969 | Cain | 74/107 X |
| 4,614,130 | 9/1986 | Heismann | 74/501.5 R |
| 4,656,926 | 4/1987 | Bauer et al. | 74/471 R X |
| 4,743,721 | 5/1988 | Thuries et al. | 74/97.1 X |
| 4,776,543 | 10/1988 | Stableford | 74/501.5 R X |
| 4,813,304 | 3/1989 | Kobayashi | 74/501.5 R |
| 4,936,159 | 6/1990 | Kallio | 74/501.5 |
| 4,938,304 | 7/1990 | Yamaguchi et al. | 74/501.5 R X |
| 4,945,784 | 8/1990 | Gergoe | 74/501.5 R |
| 4,958,536 | 9/1990 | Baumgarten | 74/501.5 R |

FOREIGN PATENT DOCUMENTS

| | | |
|---|---|---|
| 992651 | 10/1951 | France . |
| 1814844 | 7/1970 | Germany . |
| 2825178 | 12/1978 | Germany . |
| 3301915 | 8/1983 | Germany . |
| 1582435 | 6/1977 | United Kingdom . |

Primary Examiner—David W. Laub
Attorney, Agent, or Firm—Evenson, McKeown, Edwards & Lenahan

[57] ABSTRACT

A control device for a remote-controllable actuation device which, counter to an energy accumulator which acts on the actuation device and loads the actuation device in the direction of a limit position, can be moved into its other limit position by a flexurally weak transmission device. In order to increase user friendliness the control device is also provided with an energy accumulator which acts on the control device, the instantaneous force of the accumulator corresponding, with opposing direction of action, to the respective instantaneous force acting on the actuation device.

3 Claims, 1 Drawing Sheet

CONTROL DEVICE FOR A REMOTE-CONTROLLABLE ACTUATION DEVICE

The present invention relates to a control device for a remote-controllable actuation device which, counter to an energy accumulator which acts on the actuation device and loads it in the direction of a limit position, can be moved into its other limit position by means of a flexurally weak transmission means.

A device of this kind is used for example in motor vehicles because, in contrast to other transmission means, a flexurally weak transmission means, for example in the form of a wire pull, can be easily adapted to prevailing restricted spatial conditions. It is disadvantageous that adjustment movements counter to the support effect of the energy accumulator sometimes require high actuation forces which are then substantially higher even if any desired intermediate positions are to be maintained correctly without constant action of the force. Such high actuation forces are in particular then felt to be burdensome, especially if they have to be applied manually as is the case for example in heating adjustment devices.

An object of the invention is to provide a control device which substantially increases user friendliness by reducing the operating forces while maintaining the characteristic of the transmission means which can be adapted to different circumstances.

This and other objects are achieved by the present invention which provides an arrangement for controlling via a control device a remote-controllable actuation device that is coupled to a first energy accumulator which biases the actuation device in the direction of a limit position. A flexurally weak transmission means couples the control device to the actuation device such that the actuation device is movable into another limit position via the transmission means. The arrangement includes the control device and a second energy accumulator that acts on the control device. An instantaneous force of the second energy accumulator corresponds, with opposing direction of action, to an instantaneous force acting on the actuation device so that in each position of the control device a force equilibrium is established when the transmission means is pulled taut.

In certain exemplary embodiments of the invention the transmission means is a cable.

Only a small degree of expenditure and constructional space is required if the two energy accumulators are metal springs, as provided in certain embodiments.

In certain embodiments of the invention, when the actuation device is secured in a limit position by moving the control device into an over-dead center position, dynamic pressure forces acting on an actuation device, such as a valve, in its closed position cannot lead to an undesired adjustment movement.

For an exemplary embodiment of a control device which in particular controls air vents of a heating system or air-conditioning system in a motor vehicle, the control device is provided with a cam plate with which contact can be made at the edge. An opposing force which compensates the active force acts at the edge point of intersection which lies opposite the respective contact point for the actuation movements and has a connecting straight line which runs from the contact point through the center of rotation of the cam plate.

In an exemplary embodiment of the invention, the cam plate is provided with at least two migrating contact points. A second cam plate, at whose edge only a single opposing force acts at one point, is arranged on the same axis as the first cam plate, where in each case a force compensation is established with respect to the active instantaneous diameter of the second cam plate.

In order at least to approach a predetermined position in a selective fashion, the second cam plate is provided with at least one edge locking bay in certain embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
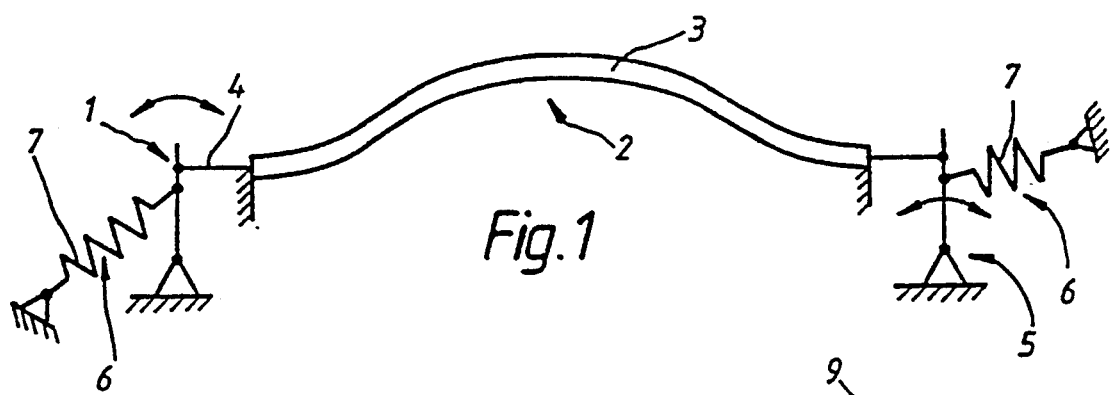
FIG. 1 shows a basic illustration of a spring-loaded control device constructed in accordance with an embodiment of the present invention and an actuation device which is spring-loaded in the opposite direction and has a flexurally weak cable as transmission means.

A control device 1 indicated in FIG. 1 is connected to an actuation device via a flexurally weak transmission means 2 in the form of a cable 4 guided in a sheath 3. The control device 1 can be for example an airflow regulating lever of a heating system or air conditioning system of a motor vehicle while the actuation device 5 can be formed by an air vent. This is exemplary only and other control devices and actuation devices are contemplated. Since only tensional forces can be transmitted via the cable 4, an energy accumulator 6, which in the simplest design consists of a metal spring 7, acts both on the control device 1 and on the actuation device 5. The direction of action of the two metal springs 7 are opposed to one another and the respectively active forces are of such a size that in each actuation position a force equilibrium is established. As a result, user friendliness is considerably increased and an automatic adjustment is excluded to the greatest possible extent.

Figure 2:
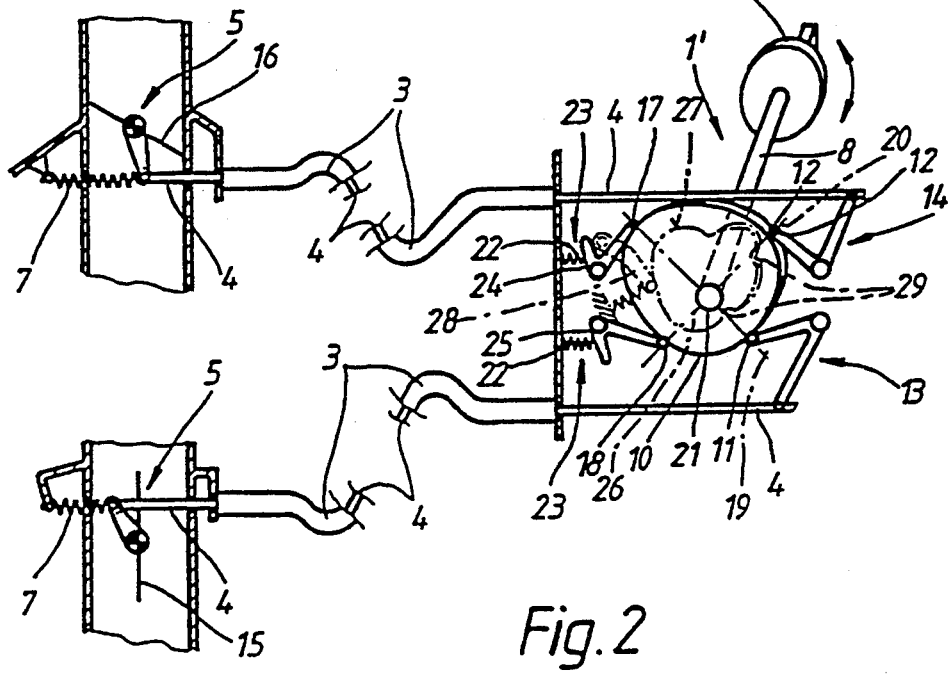
FIG. 2 shows a heating vent control with double contact of a control cam constructed in accordance with an embodiment of the present invention.

A practical embodiment of such a control device i which acts on two actuation devices 5 can be seen in FIG. 2. A cam plate 10 has a periphery that is travelled over by two angular levers 13, 14 which act in each case at a contact point 11, 12. The cam plate 10 is fixedly attached in terms of rotation on the axle 8 of a rotary knob 9. A cable 4 which is laid in a sheath 3 leads from the free arm of the angular lever 13 to a leg-room vent 15. A cable 4 which is laid in a sheath 3 leads from the free arm of the other angular lever 14 to a defrosting vent 16. The curved shape of the cam plate is such that the leg-room vent 15 and the defrosting vent 16 can be opened and closed alternately. First metal springs 7 are biased to pull the leg-room vent 15 and the defrosting vent 16 into their open positions so that the respective cam-side angular lever 13 or 14 acts with a certain amount of force at the respective contact point 11 or 12.

In order to compensate this force, in each case an opposing force of equal magnitude acts at an edge point of the cam plate 10 which marks the respective point of intersection 17 or 18 of a connecting straight line 19 or 20 respectively, which, starting from the contact points 11 and 12, is guided through the point of rotation 21 of the cam plate 10 up to its opposite edge. The opposing forces are supplied by the energy accumulator 23 constructed as metal springs 22 and are transmitted via angular levers 24 and 25.

A further possible means of force compensation is outlined by dot-dashed lines in FIG. 2. A second cam plate 26 is arranged on the same axis as the cam plate 10 and the curved shape of this cam plate 26 is such that an opposing compensating force is generated by only one spring-loaded lever 28 pressed against the edge 27 of the second cam plate 26. Two edge locking bays 29 into which the free lever arm of the lever 28 runs when selected actuation positions of the leg-room vent 15 and of the defrosting vent 16 are reached are also indicated.

Figure 3:
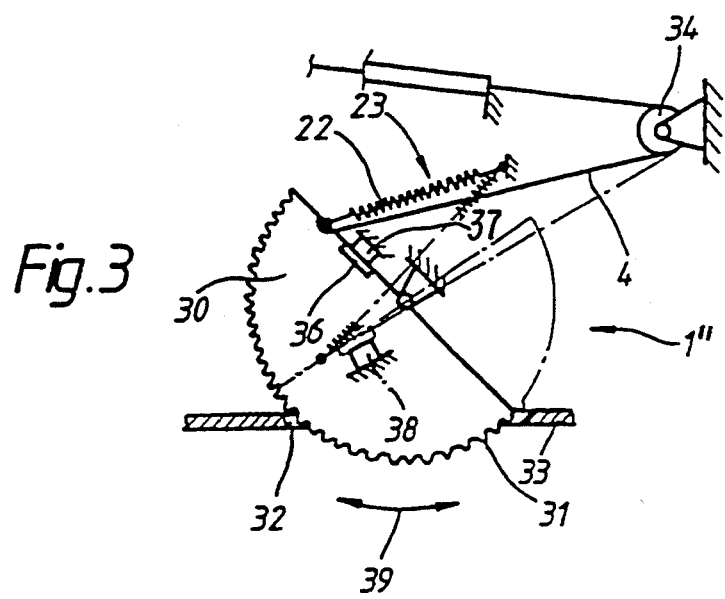
FIG. 3 shows a flap control constructed in accordance with an embodiment of the present invention with over-dead-center position in a limit position.

FIG. 3 shows in simplified form a control device 1 with an approximately semicircular control wheel 30 which is burred at the edge and from which a control section 31 emerges from a slot 32 in a control face 33. A cable 4 leads from the control wheel to a deflection roller 34 and from there to an actuation device (not shown). Furthermore, a metal spring 22 acts on the control wheel 30 as an energy accumulator 23. The force supported over-dead-center course of the cable 4 is achieved when the swivel position of the control wheel 30 which corresponds to the closed position of the actuation device (not shown) and is illustrated by dot-dashed lines is reached. Therefore forces, for example flow forces, acting on the actuation device cannot bring about an undesired adjustment movement. A control-fixed stop 36 bounds the swivel movements of the control wheel 30 which can be carried out in the direction of the arrow 39 by running up against fixed stops 37 and 38. In a modification of the exemplary embodiment, according to FIG. 3, which is reproduced in simplified form, the section of the cable 4 which is guided from the control wheel 30 to the deflection roller 34 could also be replaced by a rigid coupling.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A control device for a remote-controllable actuation device comprising:
    a first energy accumulator that is a metal spring which acts on an actuation device and loads the actuation device with a first instantaneous force in a direction of a first limit position;
    a flexurally weak transmission means that is a cable which couples the control device to the actuation device and that moves the actuation device to a second limit position in a direction counter to the loading of the actuation device by the first energy accumulator:
    a second energy accumulator that is a metal spring that acts with a second instantaneous force on the control device that compensates the action of the first instantaneous force acting on the actuation device, the second instantaneous force is equal to the first instantaneous force such that a force equilibrium is established when the control device positions the actuation device in a position between the first limit position and the second limit position;
    wherein the control device includes a cam plate having a contact cam edge, and wherein the second instantaneous force acts at a first contact point on the contact cam edge which lies about the cam plate opposite an activation contact point, such that the first contact point and activation contact point are fixed on a straight line that passes through the axis of rotation of the cam plate.

2. The arrangement according to claim 1, wherein the cam plate has at least two migrating contact points and a second cam plate, at whole edge only a single opposing force acts at one point, is arranged on the same axis as the cam plate, where in each position of the cam plate a force compensation is established with respect to a respectively active instantaneous diameter of the second cam plate.

3. The arrangement according to claim 2, wherein the second cam plate has at least one edge locking bay.

* * * * *